(12) United States Patent
Edwards et al.

(10) Patent No.: US 6,351,868 B1
(45) Date of Patent: *Mar. 5, 2002

(54) BRISTLE SUB-ASSEMBLIES HAVING PARALLEL PAIRS OF BRISTLES; AND METHODS

(75) Inventors: Mark Stephen Edwards, Hockessin, DE (US); Robert Maurice Brown, Boothwyn; Winship Stinson Reed, III, Nottingham, both of PA (US)

(73) Assignee: E.I. duPont de Nemours & Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,308

(22) Filed: Dec. 6, 1999

Related U.S. Application Data

(63) Continuation-in-part of application No. 09/092,092, filed on Jun. 5, 1998, now Pat. No. 6,096,151, and a continuation-in-part of application No. 09/092,094, filed on Jun. 5, 1998, now Pat. No. 6,269,514.

(51) Int. Cl.$^7$ ................................................. A46B 3/06
(52) U.S. Cl. ........................ 15/207.2; 15/205; 15/DIG. 5
(58) Field of Search .......................... 15/186, 190, 195, 15/167.1, 207.2, 182, DIG. 5; 428/95

(56) References Cited

U.S. PATENT DOCUMENTS

| 1,296,067 A | | 3/1919 | Fuller |
| 1,684,855 A | | 12/1928 | Acheson |
| 2,475,019 A | * | 7/1949 | Faris ........................ 156/173 |
| 2,599,191 A | | 6/1952 | Meunier |
| 2,786,508 A | | 3/1957 | Waage |
| 2,812,214 A | | 11/1957 | Sandelin |
| 2,980,467 A | | 4/1961 | Lechene |
| 3,216,038 A | | 11/1965 | Gould et al. |
| 3,263,258 A | | 8/1966 | Burge |
| 3,618,154 A | * | 11/1971 | Muhler et al. ............. 15/167.1 |
| 3,798,699 A | | 3/1974 | Lewis, Jr. |
| 4,014,064 A | * | 3/1977 | Okazaki ................. 15/DIG. 5 |
| 4,030,845 A | | 6/1977 | Deckert |

(List continued on next page.)

FOREIGN PATENT DOCUMENTS

| DE | 2361482 | 6/1974 |
| DE | 4114136 | 11/1992 |
| DE | 19536775 | 4/1997 |
| DE | 19604559 | 8/1997 |
| FR | 2541-100 A | 8/1984 |
| GB | 384909 | 12/1932 |
| GB | 1457074 | 12/1976 |
| JP | 1-236008 A | 9/1989 |
| JP | 6-154030 | 6/1994 |
| WO | WO 97/14830 | 4/1997 |
| WO | WO 97/39651 | 10/1997 |
| WO | WO 98/25500 | 6/1998 |
| WO | WO 99/42019 | 8/1999 |
| WO | WO 99/62371 | 12/1999 |

OTHER PUBLICATIONS

PCT International Search Report, dated Mar. 2, 2001.

*Primary Examiner*—Terrence R. Till

(57) ABSTRACT

An apparatus for forming bristle sub-assemblies includes a vertically oriented slot, which is formed by two endless belts. A wheel disposed above the slot pushes a bristle string into the slot. The bristle string has a plurality of bristles connected to a base string in two rows. The bristle rows can be horizontally oriented, so that all of the bristles are co-planar in a horizontal plane, or they can be angularly oriented with the base string at the vertex of the angle. When the bristles are pushed into the slot, they bend to adopt a new, substantially parallel orientation. An ultrasonic heater heats the bent bristles to re-set the thermoplastic material from which the bristles are made so that after cooling, the parallel orientation is maintained.

8 Claims, 6 Drawing Sheets

U.S. PATENT DOCUMENTS

| | | |
|---|---|---|
| 4,148,953 A | 4/1979 | Horton |
| 4,211,217 A | 7/1980 | Gueret |
| 4,325,900 A | 4/1982 | Holding et al. |
| 4,382,309 A * | 5/1983 | Collis ................ 15/167.1 |
| 4,406,032 A | 9/1983 | Diamant |
| 4,423,532 A | 1/1984 | Yagi et al. |
| 4,438,541 A | 3/1984 | Jacob et al. |
| 4,493,125 A | 1/1985 | Collis |
| 4,507,361 A | 3/1985 | Twilley et al. |
| 5,459,898 A | 10/1995 | Bacolot |
| 5,470,629 A | 11/1995 | Mokhtar et al. |
| 5,472,762 A | 12/1995 | Edwards et al. |
| 5,547,732 A * | 8/1996 | Edwards et al. ........ 156/435 X |
| 5,682,911 A | 11/1997 | Harada |
| 5,804,008 A * | 9/1998 | Kennard et al. ........ 156/174 X |
| 5,967,617 A * | 10/1999 | Zapanta ................ 300/21 |
| 6,085,380 A * | 7/2000 | Gonda et al. ............. 15/207.2 |
| 6,088,870 A * | 7/2000 | Hohlbein ................ 15/167.1 |

* cited by examiner

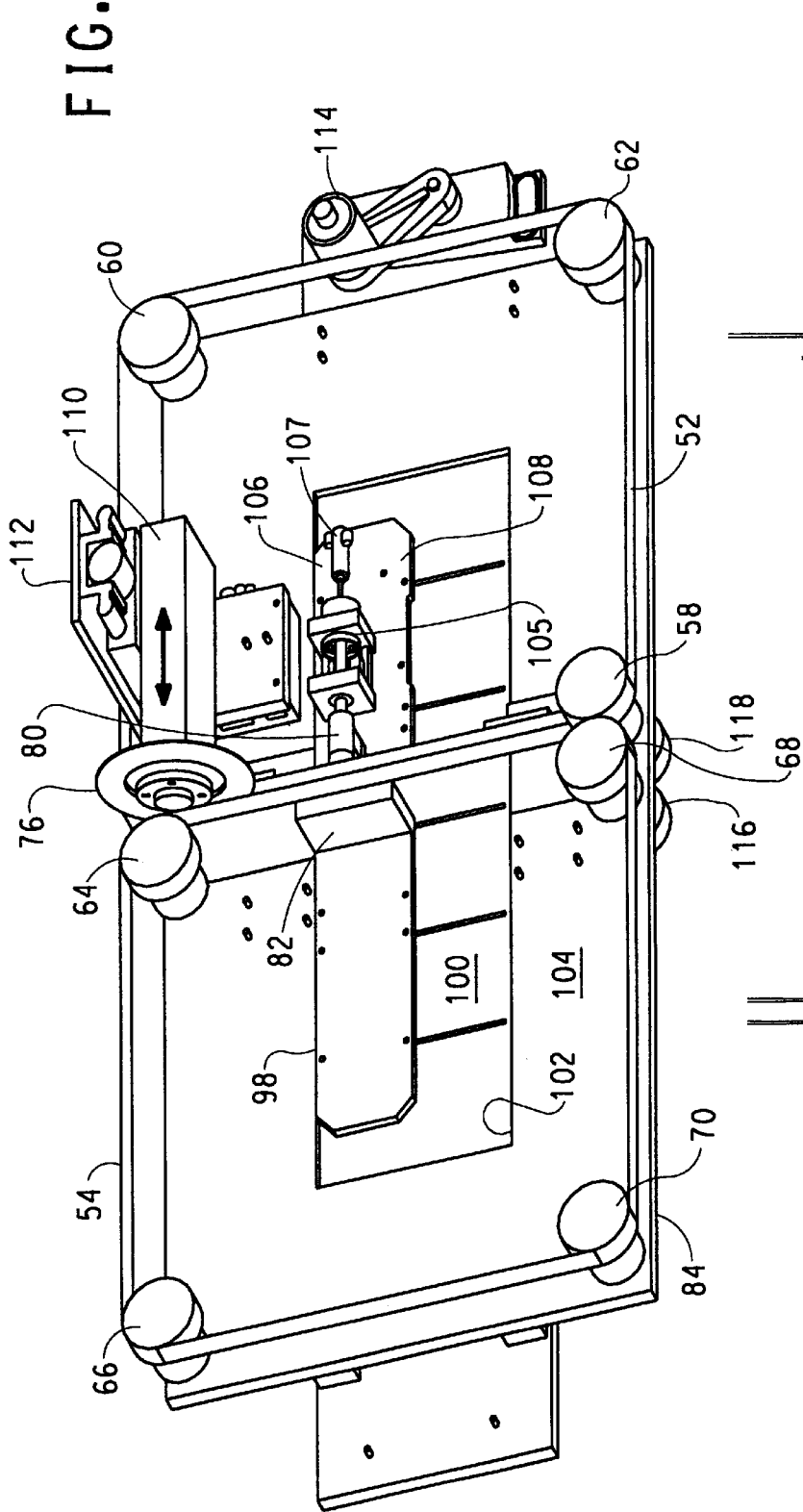
FIG. 9
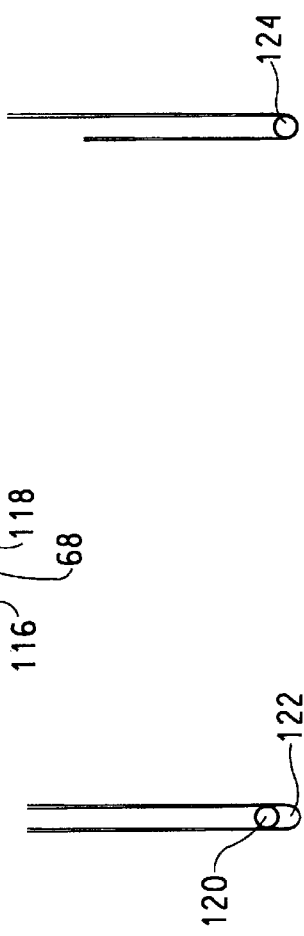
FIG. 10
FIG. 11

BRISTLE SUB-ASSEMBLIES HAVING PARALLEL PAIRS OF BRISTLES; AND METHODS

CROSS REFERENCE TO RELATED APPLICATIONS

This application is a continuation-in-part of U.S. application Ser. No. 09/092,092, filed on Jun. 5, 1998, now U.S. Pat. No. 6,096,151 and a continuation-in-part of U.S. application Ser. No. 09/092,094, filed on Jun. 5, 1998 now U.S. Pat No. 6,269,514.

BACKGROUND OF THE INVENTION

The present invention relates generally to the field of brush and bristle making, and more specifically, to a bristle sub-assembly having substantially parallel pairs of bristles that are attached to a base string. Bristle sub-assemblies of the type described herein are used in making bristle tufts in a variety of applications, especially toothbrushes.

DESCRIPTION OF THE RELATED ART

In my prior co-pending application, there is described a method of forming bristle sub-assemblies which, in brief, involves wrapping a polymeric monofilament around a mandrel and bonding the individual wraps to one or more base strings by applying thermal energy. As seen in FIG. 1, an apparatus 10 for making bristle sub-assemblies includes a rectangularly shaped mandrel 12 having a central passageway and open, opposite axial ends. Four base strings 14, 16, 18 and 20 are fed into one end of the mandrel from respective supply sources 22, 24, 26, and 28.

From the orientation of FIG. 1, the base strings are fed downwardly through the mandrel 12 and pass outwardly from the opposite end. Pulleys or wheels (not shown) are used to turn the base strings substantially 180° so that they can run along the respective four corners of the mandrel in the upward direction. While the base strings are running upwardly, a monofilament 30, supplied from a supply 32, is supplied at a controlled feed rate to a wrapping mechanism 34. The wrapping mechanism 34 includes a motor 36 which drives a wrapper 38, through which the monofilament 30 is fed, so that the monofilament is caused to wrap around the mandrel to form a plurality of wraps 40. The wraps are transported upwardly by the upward movement of the base strings.

The wraps pass under heaters 42, one being disposed at each of the four corners of the mandrel 12 (and only two of the four heaters being illustrated in FIG. 1). As the result of application of thermal energy, such as by ultrasonic welding, the monofilament wraps 40 bond to the four base strings, either by melting the base strings or the monofilament, or both. After bonding, the wraps are passed over rotating cutting knives 44, of which there are four in the embodiment of FIG. 1, thereby forming four bristle strings 46, of which only two are partially shown and one is shown being taken up on a spool 48.

FIG. 2 is an enlarged, end view of the bristle string 46, revealing the base string 20 and two bristles 30a and 30b, constituting a bristle pair, which are connected to the base string 20 as a result of the thermoplastic melting of the monofilament 30 during the bonding step. The bristle string 46 would be a continuous length of base string with two, complementary rows of bristles, which as viewed in FIG. 2, would constitute a left row and a right row disposed at complementary angles to each other. Each bristle of one row would be paired, and substantially co-linear with, a bristle from the other row.

The angled orientation of the bristles results from the bonding step involved in the illustrated embodiment. However, variations of the manufacturing process of FIG. 1 could result in a similar bristle string except with all the bristles being co-planar. An example is shown in FIG. 3, in which the bristle pair 30a' and 30b' of the bristle string 46' are not only co-linear, but co-planar as well.

While the bristle strings described above are advantageous in making toothbrushes, among other things, by cutting the bristle strings into lengths that become "bristle sub-assemblies" that can be used to form bristle tufts on a brush head, the bristle pairs of the bristle sub-assemblies may at times be preferred to be fixed in a parallel orientation with respect to each other, prior to securing the bristle sub-assemblies in a brush.

SUMMARY OF THE INVENTION

An object of the present invention is to provide a bristle subassembly in which bristle pairs are fixed in an orientation where the bristles of each pair are oriented substantially parallel to each other.

Another object of the present invention is to provide an apparatus for forming bristle sub-assemblies in which the bristles of each bristle pair are fixed in a substantially parallel orientation with respect to each other.

Still another object of the present invention is to provide a method of forming bristle sub-assemblies in which the bristles of each bristle pair are fixed in a substantially parallel orientation with respect to each other.

Yet another object of the present invention is to provide a method of changing the directional orientation of monofilament bristles by heating to a temperature that is high enough to relieve the spring forces that are generated by bending the bristles to the new direction of orientation, yet low enough to avoid causing the molecular structure of the polymeric monofilament bristle material to change significantly. Partial melting at the interface between the bristles and base string is preferred to provide additional bonding between the bristles and base string.

These and other objects are met by providing a bristle sub-assembly which includes a base string, a first row of bristles connected to and extending radially outwardly from the base string, and a second row of bristles connected to and extending radially outwardly from the base string, wherein the first and second rows of bristles are substantially parallel to each other.

In another aspect of the invention, a method of making bristle sub-assemblies includes the steps of forming a bristle string having first and second rows of bristles extending outwardly from a base string, wherein the first and second rows of bristles are disposed in a first orientation with respect to each other, bending the bristles of at least one of the first and second rows of bristles to achieve a second orientation with respect to each other, thereby developing a spring force in the bristles that tends to restore the bristles to the first orientation, heating the bent ones of the bristles to a temperature sufficient to at least relax the spring force while maintaining the bristles in the second orientation and preferably add further bond area between the bristles and base string, and cooling the heated bristles so that the bristles maintain the second orientation.

In another aspect of the present invention, an apparatus for forming bristles sub-assemblies using as a feed material a bristle string having first and second rows of bristles connected to a base string, the first and second rows being in a first orientation relative to each other, wherein the apparatus includes means for bending the bristles of at least one of the first and second rows of bristles to achieve a second orientation of the bristle rows relative to each other, thereby developing a spring force in the bent bristles that biases the bent bristles towards the first orientation, means for heating the bristles bent in the bending step for a time and temperature sufficient to at least relax the spring force and preferably add further bond area between the bristles and base string, and means for cooling the heated bristles so that the bristles maintain the second orientation.

These and other objects of the invention will become more apparent from the following detailed description when taken in conjunction with the illustrative embodiments in the accompanying drawings.

BRIEF DESCRIPTION OF THE DRAWINGS

FIG. 9 is a top perspective view showing a particularly preferred apparatus according to the present invention for making bristle sub-assemblies;

FIG. 10 is an end view of a bristle sub-assembly capable of being formed using the apparatuses of the present invention, in which two bristle strings are fed into the apparatus; and FIG. 11 is an end view of a bristle sub-assembly capable of being formed using the apparatuses of the present invention, in which the bristles of one row are longer than those of the other row.

DETAILED DESCRIPTION OF THE PREFERRED EMBODIMENTS

Figure 1:
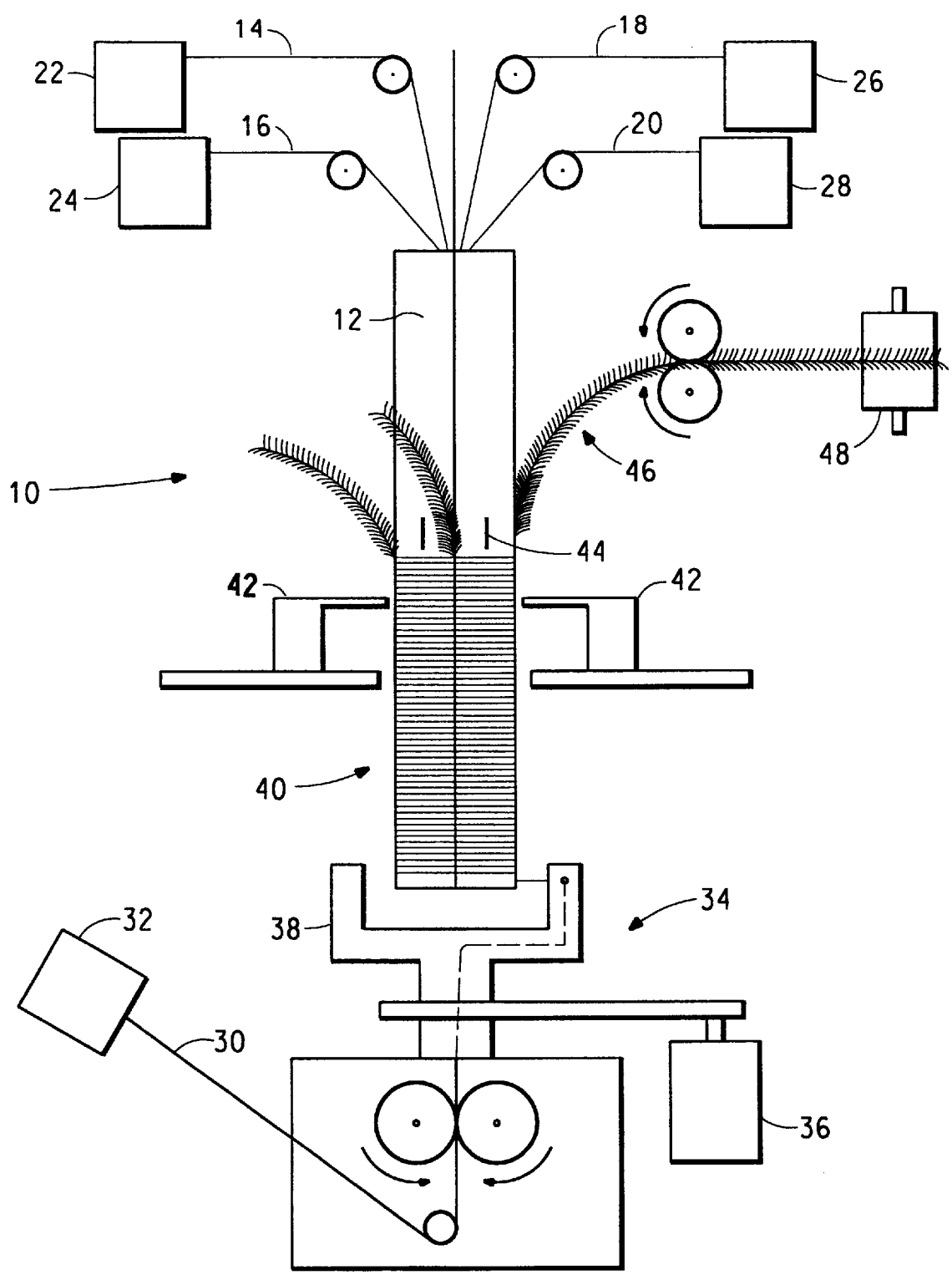
FIG. 1 is a schematic view of an apparatus for forming bristle strings, in which a plurality of bristles are connected to a base string in first and second rows.
Figure 2:
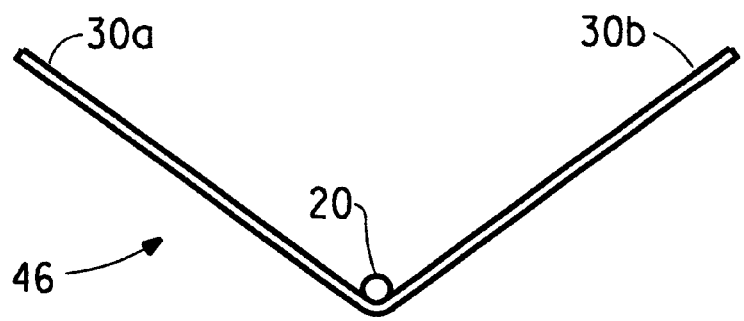
FIG. 2 is an end view of a bristle string in which the first and second rows of bristles are disposed at an angle with respect to each other, with the base string disposed at the vertex of the angle.
Figure 3:
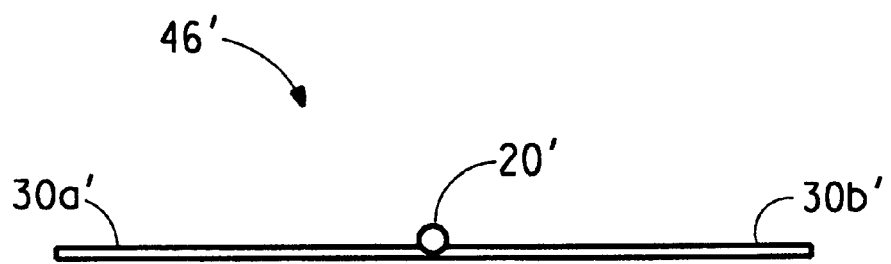
FIG. 3 is an end view of a bristle string in which the first and second rows of bristles are horizontally disposed, extending in 180° opposite directions, in substantially the same plane.
Figure 4:
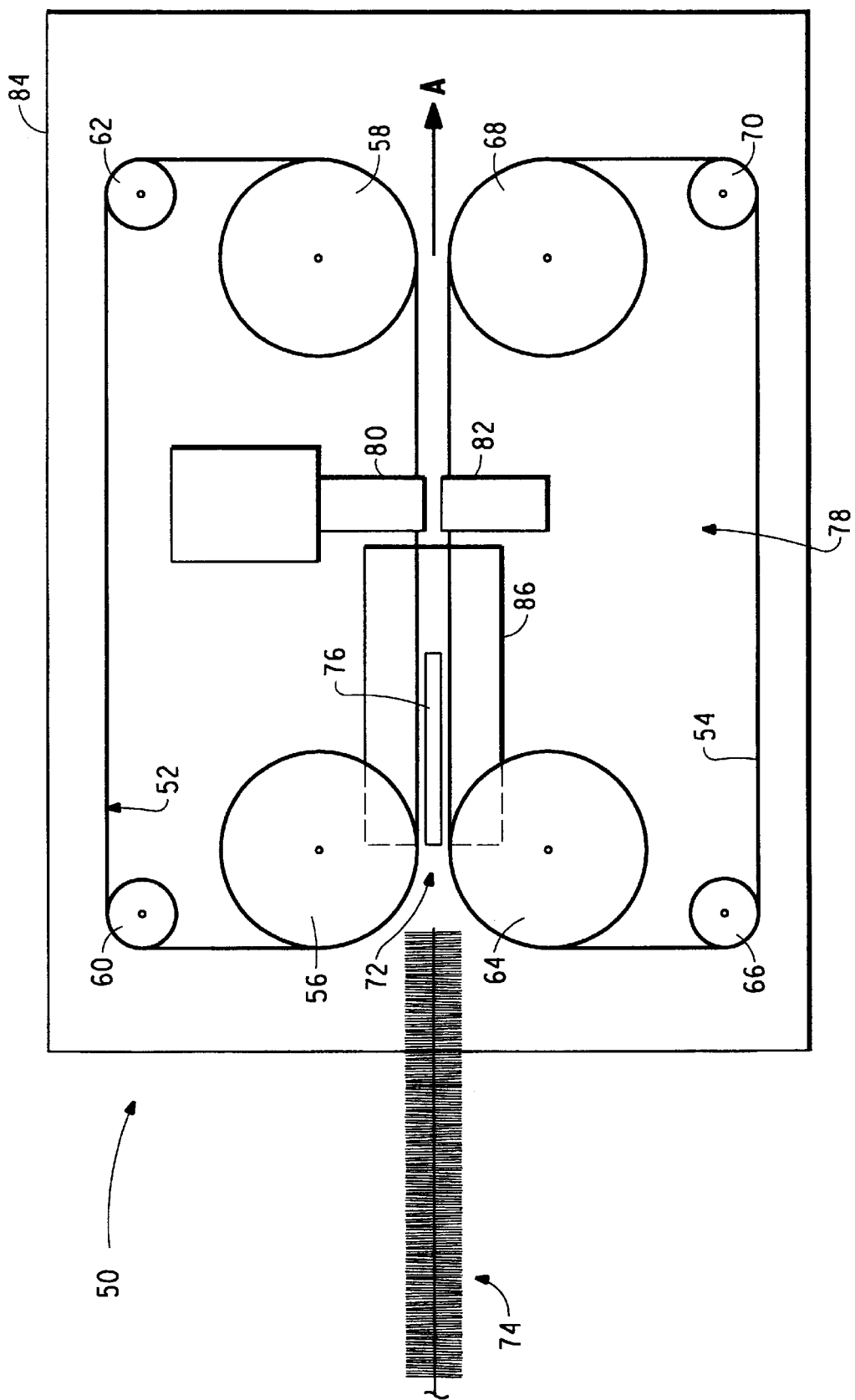
FIG. 4 is a schematic, top plan view of an apparatus for making bristle sub-assemblies with substantially parallel pairs of bristles according to the present invention.
Figure 5:
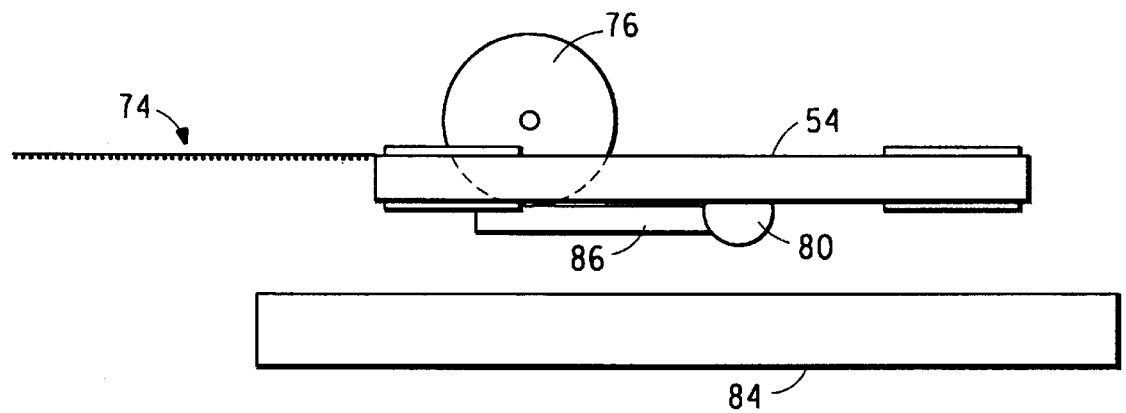
FIG. 5 is a schematic, side elevation view of the apparatus of FIG. 4.

Referring now to FIGS. 4 and 5, an apparatus 50 for making bristle sub-assemblies includes a first endless belt 52 and a second endless belt 54. The first endless belt is supported on rotatable pulleys 56, 58, 60 and 62, while the second endless belt 54 is supported on rotatable pulleys 64, 66, 68 and 70. The belts 52 and 54 are juxtaposed to define a nip 72 at a forward end where the belts are parallel and running in the same direction, which is indicated by the directional arrow "A."

A bristle string 74 having a base string and plural pairs of bristles, whether in the V-shaped orientation or the flat orientation described previously, is fed into the area of the nip 72. A "tucker" wheel 76 presses on the bristle string 74 to effectively bend the bristles from a generally outward orientation to a generally upward orientation. In the upward orientation, the bristles of the bristle pairs are substantially parallel to each other.

Now with the bristles in the upward, parallel orientation, the bristle string 74 is transported by the first and second belts 52 and 54, being held therebetween by friction, to a heating station 78. While any of a variety of heating devices can be employed, a particularly preferred device is one that uses ultrasonic energy to heat the thermoplastic materials from which either the base string or the bristles, or both, are made. In the illustrated embodiment, the heating station 78 includes an ultrasonic horn 80 and an anvil 82, which are positioned below the belts 52 and 54 at a height selected to allow the base string to pass through the gap between the horn and the anvil.

The various pulleys, the heating station, and the tucker wheel are mounted on a base plate 84. The various drive mechanisms are not shown for clarity of illustration. The first and second belts are synchronized to rotate at the same speed using any of a variety of known drive mechanisms. Preferably, the tucker wheel 76 rotates at a speed which is synchronized with the first and second belts, so that the tucker wheel 76 neither brakes nor accelerates the bristle string as it passes between the belts.

The height of the tucker wheel 76 is adjustable, as is the gap between the two belts 52 and 54, to accommodate various sizes of bristle strings. Also, a guide plate 86 is positioned beneath the tucker wheel 76 to limit the downward extent of movement of the bristle string as it is "tucked' between the two belts 52 and 54. The vertical, as well as horizontal, position of the guide plate 86 is adjustable. Any of a variety of well known structures can be used to render the guide plate 86 adjustable.

Figure 6:
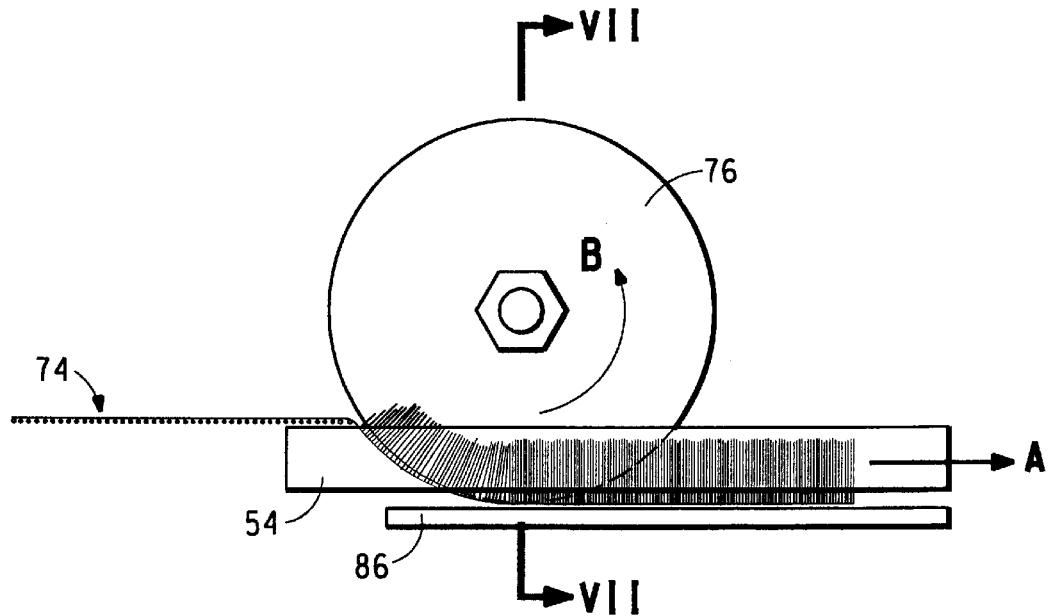
FIG. 6 is an enlarged schematic, partial side elevational view of a portion of the apparatus of FIG. 4, and showing the bristles of the bristle string being folded into a parallel orientation.

FIG. 6 shows an enlarged view of the process by which the bristles are folded from an initial flat disposition, in which the bristles of a pair are co-linear and extend substantially 180° in opposite directions, to a parallel disposition, in which the bristles of a pair are each folded substantially 90° to extend upwardly from the base string in the same direction. As the tucker wheel 76 rotates in the direction "B," and the belts transport the bristle string 74 in the direction "A," the outer circumferential surface of the tucker wheel 76, which is disposed between the bristle pairs, causes the bristle string to move downwardly until it abuts, or comes into proximity to, the guide plate 86.

Figure 7:
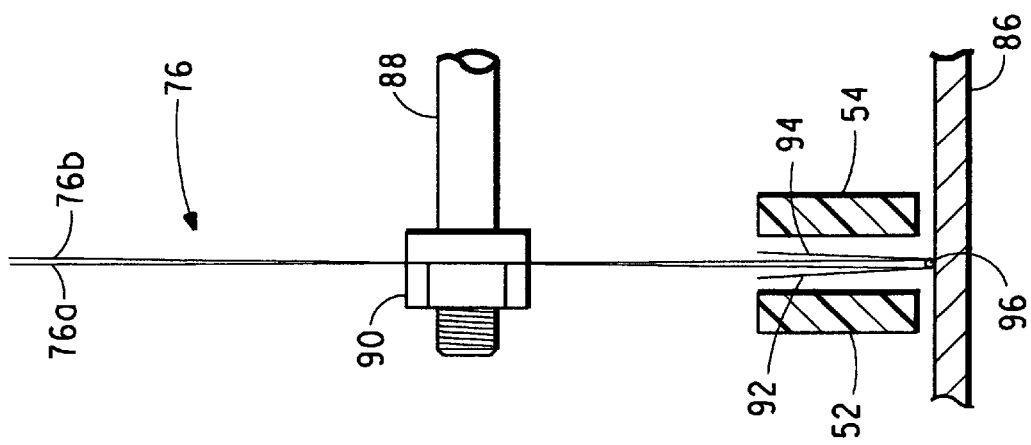
FIG. 7 is an enlarged partial sectional view, substantially of the structure shown in FIG. 6, taken along line VII—VII.

FIG. 7 shows that the tucker wheel 76, in a preferred embodiment, can be formed from two sheet metal discs 76a and 76b which are mounted on a rotatable shaft 88. When a securing nut 90 is tightened, the discs 76a and 76b rotate in unison with each other and the shaft 88.

As seen in the drawing, the peripheral or circumferential edges of the two discs are spaced slightly apart so that, when the discs extend between the bristles 92 and 94 of a bristle pair, they engage opposite sides of the base string 96. At the same time, belts 52 and 54 maintain the bristles 92 and 94 in the parallel, folded position as the bristle string is transported under the tucker wheel 76.

Figure 8:
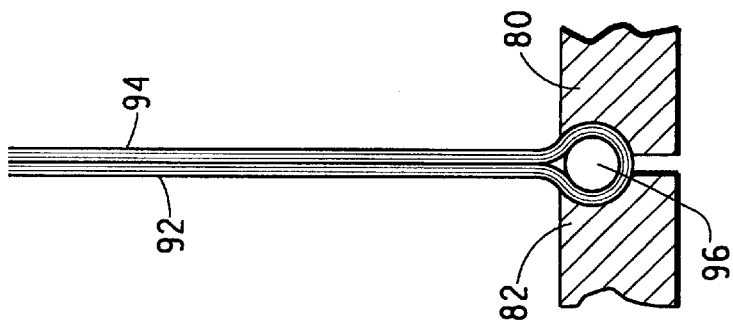
FIG. 8 is an enlarged end view of a bristle string, showing the bristles of a bristle pair folded into the vertical, parallel orientation.

As seen in FIG. 8, after folding the bristles 92 and 94 are parallel to each other and extend substantially in the same direction, which is substantially perpendicular to the direction of the base string 96. Since the bristles 92 and 94 are integrally formed, a portion of the monofilament that forms the two bristles wraps around the base string; before wrapping, the base string 96 was essentially tangential to the bristles, so that the area of contact between the base string and the bristles was relatively small. Folding in essence increases the area of contact, or points of contact, between the bristles and the base string.

To keep the bristles in the newly adopted vertical and substantially parallel orientation, the belts 52 and 54 transport the bristle string to the heating station 78. In the embodiment that employs ultrasonic heating, the horn 80 and anvil 82 are preferably positioned so that they form a gap, as shown in FIG. 8, through which the base string 96 and bristles 92 and 94 pass. Note that the horn 80 and anvil 82 are shaped to assist the bending of the bristles around the sides of the base string, thus providing additional points of contact in the vertical direction. When ultrasonic energy is delivered to the bristles and base string at this area of contact between them, the energy has two effects: first, it causes both the base string and bristles to partially melt at their contacting surfaces which in turn causes them to further weld them together, thereby fixing the bristles in the second, parallel orientation. Secondly, it heats the bristles so that they relax, i.e., they no longer have the tendency to spring back to their unfolded, original orientation. Upon exiting the heating station, the bristles are cool and will stay in their new substantially parallel orientation, either by the stress relief imparted to the bent bristles, or by the additional bonding which occurs along the sides of the base string, or both.

More details of the preferred apparatus 50 are shown in FIG. 9. In particular, the anvil 82 is mounted on a support plate 98 which is adjustably mounted on a backing plate 100 that is mounted under a opening 102 formed in the base plate 84. The backing plate 100 is provided with parallel slots 104 which facilitate longitudinal adjustment of the anvil 82 along the length of the belt path which transports the bristle string. Lateral adjustments of the anvil 82 can be accomplished by using shims to mount the anvil 82 to the support plate, or by adjusting the position of the backing plate laterally inwardly or outwardly.

Similarly, the ultrasonic stack assembly 105 is mounted on a support plate 106 which is adjustably mounted on the backing plate 100. The stack assembly 105 is pressed into the bristles, base string and anvil 82 by a pneumatic cylinder 107. The horn 80 is driven by a transducer 108 with enough energy to deliver sufficient thermal energy to the bristles to cause partial melting. The transducer 108, horn 80 and anvil 82 are commercially available and their operation is well known. Using the preferred monofilament materials, which are basically nylons and polyesters, the ultrasonic energy preferably rapidly heats only the surfaces of the materials to their melting points before the energy is removed by the forward progress of the bristle string. However, virtually any thermoplastic monofilament materials can be employed. Particularly preferred materials include TYNEX and CHINEX, which are nylon monofilaments, and OREL, which is a polyester monofilament, all of which are made by E.I. du Pont de Nemours & Co. of Wilmington, Del. USA.

The monofilament material which comprises the bristles can be made of other similar materials, including aliphatic polyamides, aromatic polyamides, polyesters, polyolefins, styrenes, fluoropolymers, polyvinylchloride (PVC), polyurethane, polyvinylidene chloride, and polystyrene and styrene copolymers. A particularly suitable polymeric material for toothbrush applications include the following: 6,12 nylon; 4 nylon; 6 nylon; 11 nylon; 12 nylon; 6,6 nylon; 6,10 nylon; 6,14 nylon, 10,10 nylon; 12,12 nylon and other nylon co-polymers. The base string can be made of similar materials.

The monofilaments used for bristles and/or the base string can have shapes other than circular cross-sections, and may be hollow or have voids in their cross-section. Embodiments described herein show circular cross-sectional shapes for the base string and bristles, although virtually any cross-sectional shapes can be used, including oval, square, rectangular, etc. In any shape, the preferred thickness for the base string and monofilament bristles are selected to provide a level of functionality to the individual brush applications. Typically, the base string is slightly thicker than the bristles. For many brush applications, the range of thickness (assuming circular cross-section) ranges from 2 to 200 mils, with the preferred range for toothbrush applications being in the range of 6 to 12 mils.

FIG. 9 also shows details of the mechanism for adjusting the position of the tucker wheel 76. In particular, the wheel 76 is mounted on a support arm 110 which is adjustable in the lateral direction (shown by the directional arrow). The tucker wheel 76 is further mounted on a slide mechanism 112 which facilitates vertical adjustment of the wheel 76. Once the proper height is selected, the slide mechanism 112 locks the wheel 76 in position. Various other mechanisms can be used to adjust the position of the wheel 76, horn 80 and anvil 82.

A tension pulley 114 is provided for belt 52 to maintain proper tension of the belt. A similar tension pulley, and supporting tensioning mechanism, are provided for belt 54, but not illustrated for the sake of simplicity. The belts are synchronized and driven by drive means (not shown) that could include a servo-motor. One way of synchronizing the belts would be to provide timing pulleys 116 and 118, which can be connected via a timing belt (not shown) and driven by a common motor.

A take-up mechanism (not shown) is located downstream of the exit nip between the two belts 52 and 54, so that the bristle string can be gathered on a spool for subsequent use and/or further processing.

Alternatively, cutting mechanism (not shown) can be located downstream of the exit nip to cut the bristle string into lengths which can be used to make bristle tufts for a variety of brush shapes, sizes, and types. Once cut into lengths, the bristle string can be referred to as "bristle sub-assemblies," as they would then be used to make the bristle tufts. However, it is equally accurate to refer to the bristle string as a bristle sub-assembly, both before re-orienting the bristles according to the present invention, and afterwards.

The apparatus described herein for making bristle sub-assemblies can be used to make variations of the structures illustrated above. In particular, and with reference to FIG. 10, two bristle strings can be fed in tandem to the wheel 76, so that the two base strings 120 and 122 are disposed one on top of the other. The bristles of one can be slightly shorter than the other so that the ends of all of the bristles terminate substantially in the same plane, as shown in FIG. 10. They can also be of different diameters or cross section. Also, as seen in FIG. 11, the base string 124 can be offset from the middle of the bristles, so as to produce bristles in one row being longer than the bristles of the other row.

The base string used to make the bristle sub-assemblies described herein can be varied widely by selection of the material as well as the processing conditions used to make the oriented monofilament. Typical materials include one or more of the following: 6 nylon; 6,6 nylon; 6,9 nylon; 6,10 nylon; 6,12 nylon; 11 nylon; 12 nylon; 10,10 nylon, copolymers of 6 nylon and 6,6 nylon, or mixtures of nylons. Other examples of materials are polyesters such as polybutylene terephthalate (PBT) or trimethyleneterephthalate (3GT), polyethylenephthalate (PET) or a polyurethane, polyvinylidine chloride or polystyrene.

The base string can be varied by selecting a material with a higher or lower modulus to make the monofilament stiffer or more flexible for example, a very stiff base string could be made from polyethylene terephthalate resin from which a monofilament with tensile modulus over 1,000,000 psi can be made. A very flexible base string can be made from a thermoplastic elastomer such as a polyether block amide, like PEBAX or a polyester ether block copolymer like HYTREL, the latter being a Dupont product. In the latter two cases the monofilament would have excellent stretch recovery properties as well as low modulus. Base string properties can be further tailored either by blending materials or by coextrusion to combine materials.

Although the invention has been described with reference to a particular embodiment, it will be understood to those skilled in the art that the invention is capable of a variety of alternative embodiments within the spirit and scope of the appended claims.

What is claimed is:

1. A bristle sub-assembly comprising:
    an elongated base string having a defined, solid physical structure with a regular, geometric shape and an outer surface;
    a first row of bristles each having a defined, solid physical structure with a regular, geometric shape and an outer surface; connected to and extending radially outwardly from the base string; and
    a second row of bristles each having a defined, solid physical structure with a regular, geometric shape and an outer surface connected to and extending radially outwardly from the base string, and
    a partial melting contact area disposed at locations where the outer surfaces of the first and second rows of bristles contact the outer surface of the base string wherein the first and second rows of bristles are substantially parallel to each other, the partial melting contact area defining a bond between outer surfaces of the first and second rows of bristles and the outer surface of the base string.

2. A bristle sub-assembly according to claim 1, wherein the bristles of the first and second rows are made of a polymeric, thermoplastic material.

3. A bristle sub-assembly according to claim 2, wherein the polymeric, thermoplastic material is selected from the group consisting of aliphatic polyamides, aromatic polyamides, polyesters, polyolefins, styrenes, fluoropolymers, polyvinylchloride (PVC), polyurethane, polyvinylidene chloride, and polystyrene and styrene copolymers.

4. A bristle sub-assembly according to claim 2, wherein the polymeric, thermoplastic material is nylon.

5. A bristle sub-assembly according to claim 1, wherein the bristles of the first and second rows of bristles are substantially straight and flexible, and have proximal ends connected to the base string.

6. A bristle sub-assembly according to claim 1, wherein the bristles of the first and second rows of bristles are integrally formed bristle pairs, wherein each bristle pair comprises a single length of monofilament connected to the outer surface of the base string at about a medial point of the length of monofilament, so that the bristles of the first and second rows are substantially the same length.

7. A bristle sub-assembly according to claim 1, wherein the base string is made of a polymeric monofilament material.

8. A bristle sub-assembly comprising:
    a base string;
    a first row of bristles connected to and extending radially outwardly from the base string; and
    a second row of bristles connected to and extending radially outwardly from the base string,
    wherein the first and second rows of bristles are substantially parallel to each other and the bristles of the first and second rows of bristles are integrally formed bristle pairs, wherein each bristle pair comprises a single length of monofilament wrapped around and connected to the base string at about a point spaced from a medial point of the length of monofilament, so that the bristles of the first row has a length different from that of the bristles of the second row.

* * * * *